United States Patent [19]

Bilczo

[11] Patent Number: 4,897,773
[45] Date of Patent: Jan. 30, 1990

[54] INVERTER OUTPUT CIRCUIT
[75] Inventor: Dale L. Bilczo, Rocky River, Ohio
[73] Assignee: The Lincoln Electric Company, Cleveland, Ohio
[21] Appl. No.: 346,655
[22] Filed: May 3, 1989
[51] Int. Cl.$^4$ ............................................. H02H 7/122
[52] U.S. Cl. ....................................... 363/56; 363/26; 219/130.1
[58] Field of Search ..................................... 363/18–26, 363/55–56, 75, 90, 126, 133, 134; 323/251, 334; 219/130.1, 130.21

[56] References Cited

U.S. PATENT DOCUMENTS

| | | | |
|---|---|---|---|
| 3,818,314 | 6/1974 | Bishop et al. | 363/75 |
| 4,007,413 | 2/1977 | Fisher et al. | 363/18 |
| 4,042,872 | 8/1977 | McLeod | 363/56 |
| 4,127,894 | 11/1978 | Bishop et al. | 363/56 |
| 4,307,334 | 12/1981 | Peil et al. | 323/251 |
| 4,481,565 | 11/1984 | Colton | 363/56 |
| 4,628,426 | 12/1986 | Steigerwald | 363/21 |

Primary Examiner—Peter S. Wong
Attorney, Agent, or Firm—Body, Vickers & Daniels

[57] ABSTRACT

There is provided an improvement in an inverter power supply of the type including an output transformer of the type having a high permeability magnetic core, input winding means for applying input current pulses to the core; a first output winding wound on the core; and a second output winding wound on the core. The power supply further includes first and second output terminals and output circuit means for connecting the individual output windings to the terminals in a fashion that opposite polarity output current pulses induced in the output windings by the input current pulses are applied across the terminals in a preselected first polarity. The improvement in this power supply comprises forming the output transformer with the two output windings having essentially the same number of turns and being wound in a selected direction so that current flow caused by freewheeling from an output inductor will flow simultaneously through the two output windings in a direction to cause opposite polarity magnetizing flux in the transformer core and providing means for mounting the two output windings of the transformer adjacent to each other on the core in a tight overlapping relationship with a coefficient of coupling greater than 0.950 and preferably greater than 0.980. The best results are obtained with the coefficient greater than 0.990.

25 Claims, 5 Drawing Sheets

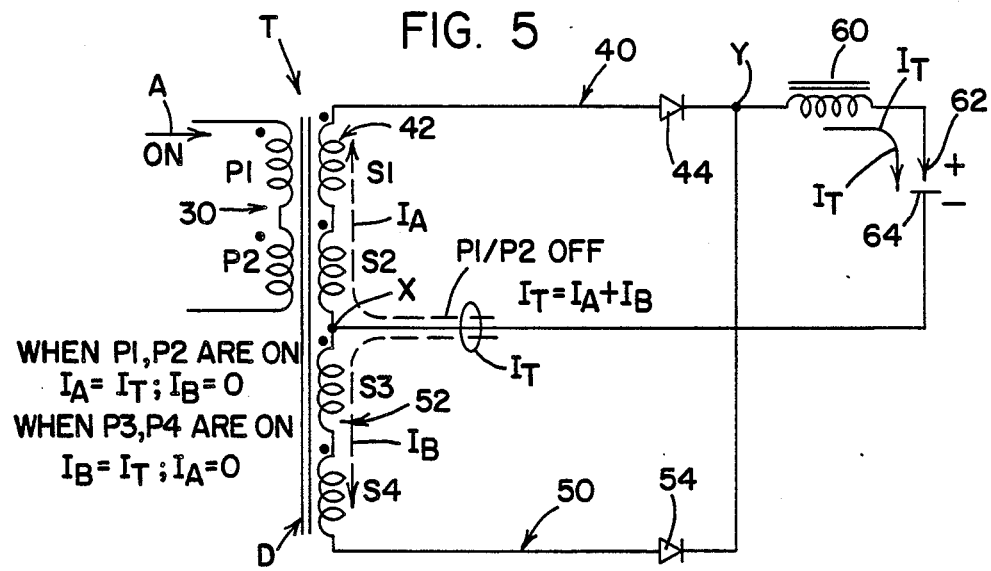
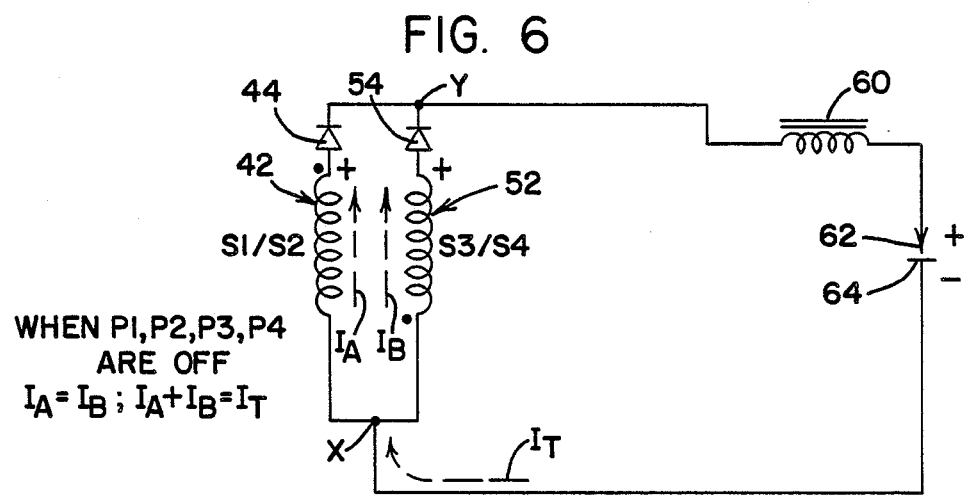

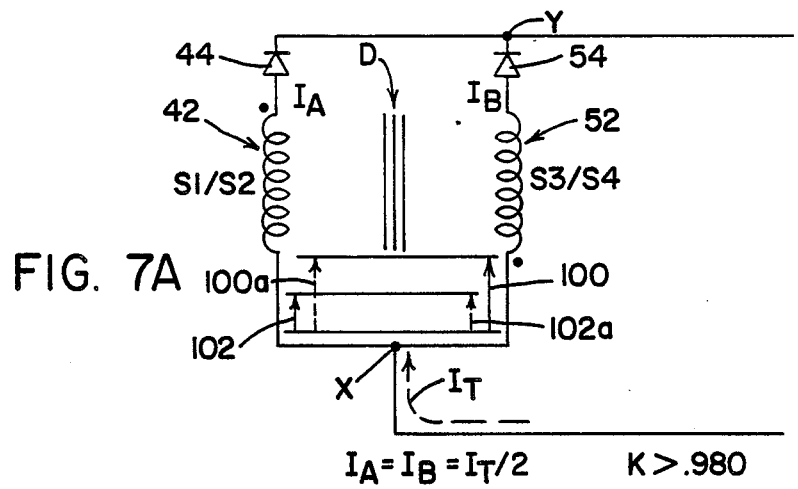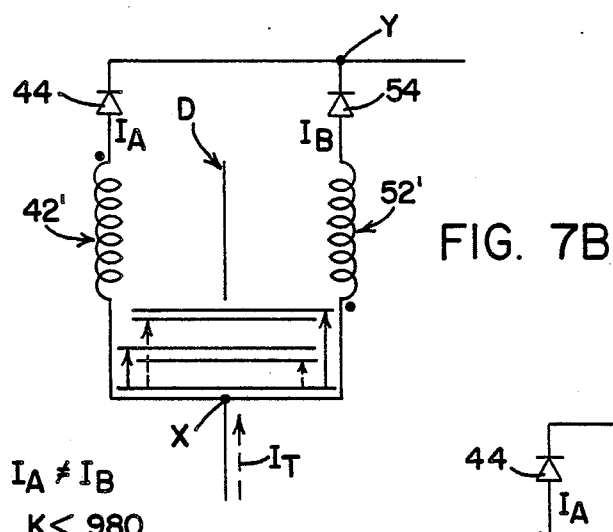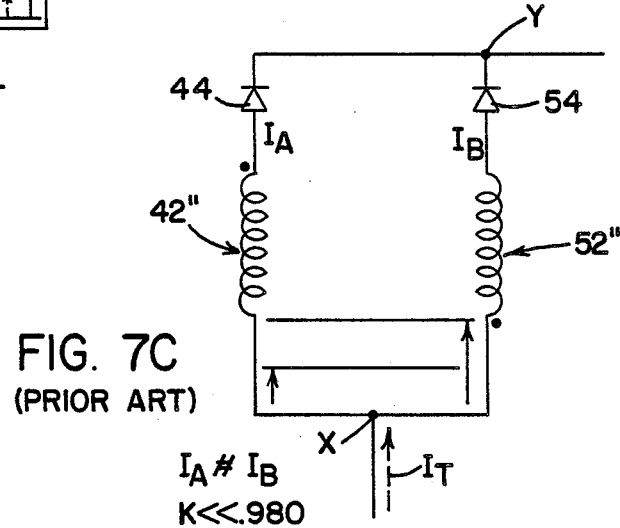

FIG. 8
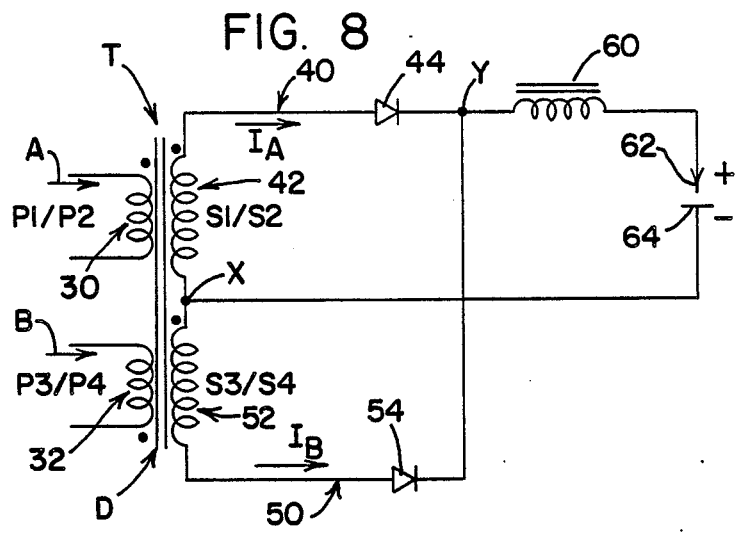
FIG. 9
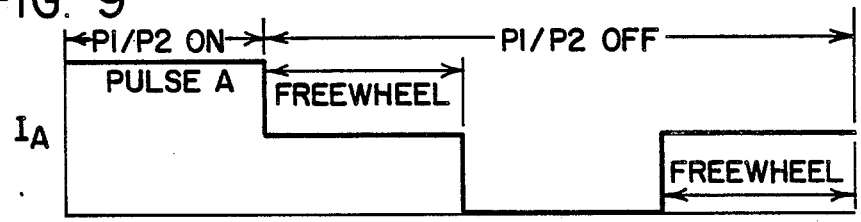
$I_A = I_B$
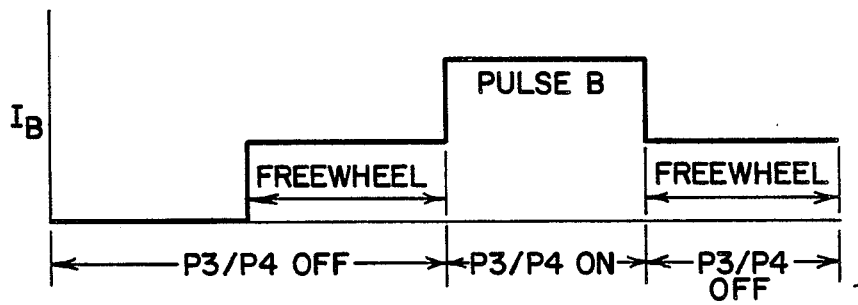

INVERTER OUTPUT CIRCUIT

DISCLOSURE

The invention relates to the art of power supplies of the type primarily used for electric arc welding and more particularly to an improved output circuit for an inverter used in electric arc welding.

It is common practice in the welding art to employ inverters which are generally in the form of resonant inverters of the half bridge or full bridge type wherein the gating circuits are controlled by SCRs. Disadvantages of this type of inverter are overcome by an inverter power supply wherein the switching devices are rendered selectively conductive and non-conductive by logic on control lines. One of the more efficient inverter designs using the advantages of controlled switching concept employs an output transformer having two separate input or primary windings. A succession of controlled D.C. current pulses is applied through the primary windings with a first pulse being switched to the first primary winding in a preselected direction to cause a corresponding current flow in a selected polarity in a first output winding on the transformer associated with the first primary winding. Thus, a D.C. current pulse gated or switched through the first primary winding creates a corresponding output current pulse in a first output winding. This output winding is connected in parallel across output terminals of the power supply. Welding electrodes are attached across these output terminals with a high impedance choke in electrical series with the electrodes. After this first pulse has been created in the first primary winding and, thus creating an output pulse in the first output winding of the transformer, the output transformer and load freewheel to allow the energy stored in the choke to flow through the choke and across the electrodes. In the past, this freewheeling current passed through a diode and circulated through a circuit including the choke.

In some instances, a single primary creates a second pulse in a second output winding of the transformer; however, this type of inverter power supply generally employs a dedicated second primary winding associated with the second output winding of the transformer for creating a second output current pulse having an opposite polarity than the first output pulse. This second pulse is induced by the second primary winding into the second output winding. This opposite polarity output pulse is directed by a unidirectional device to the output terminals for creating an output current pulse across the electrodes in the same direction as the first output pulse created by the first primary winding. In summary, a freewheel current flows after a first output pulse and then a second output pulse is created and directed through the output circuit in the same polarity direction as the first output pulse. This second pulse is followed by a freewheeling current flow. This sequence of output pulses is repeated at a desired rate to maintain the desired current flow in a given direction across the output terminals of the power supply.

Using known or standard transformer techniques, such an output circuit would require freewheeling diodes to prevent saturation of the transformer core and to reduce interference with the creation of subsequent output current pulses.

In the past, a transformer designed for use in the output circuit in the inverter, as described above, employed generally standard transformer technology wherein a core of high permeability magnetic material was wound with the individual primary windings and output windings. Consequently, the switching devices forming the inverter network at the input side of the transformer had to have substantially increased voltage and current characteristics to withstand reflected transient conditions. This increase in the capacity of the switching devices, together with the cost of the freewheeling diodes and related components associated with the application of standard transformer technology to the output transformer of an inverter circuit for electric arc welding substantially increased the overall cost and maintenance problems associated with such power supplies.

THE INVENTION

The present invention relates to a concept for improving the output circuitry of an inverter of the type used to drive an electric arc welding operation, which improvement overcomes the difficulties experienced when using standard transformer technology to design the output circuit of such inverter. In accordance with the invention, there is provided an improvement in the output circuit of the power inverter. This improvement involves a novel output transformer design which reduces the transient conditions to which the inverter switching devices are subjected, as well as dispenses with the need for freewheeling diodes in the output circuit. These advantages and others are accomplished by a unique construction of the output transformer for use in an inverter circuit of the type described above.

In accordance with the present invention there is provided an improvement in an inverter power supply of the type including an output transformer having a high permeability magnetic core, input means for applying an input current pulse to the core, wherein the input means includes an input winding encircling the core; a first output winding wound on the core; and a second output winding wound on the core. This power supply further includes first and second output terminals, a first output circuit for connecting the first output winding of the transformer in parallel with the terminals of the power supply, a second output circuit for connecting the second output winding of the transformer in parallel with the same terminals, a unidirectional device in the first output circuit allowing current flow from the first output winding across the terminals in a first polarity direction, a unidirectional device in the second output circuit allowing current flow from the second output winding across the terminal in the same first polarity direction, an inductor or choke adapted to be connected in electrical series with the output terminals and means for connecting the terminals across the output load, preferably welding electrodes. The choke maintains the arc between power pulses by preventing a rapid drop in current after each output pulse. The current is adjusted by changing the width of the input pulse; therefore, at low current the output pulses are spaced substantially. This spacing is always less than one-half the period of the switching frequency, which in the preferred embodiment is 25 millisec.

The improvement in this type of inverter is in the output circuit wherein the first and second output windings have essentially the same number of turns and are wound in the same direction on the core so that the freewheeling current from the current maintaining inductor flows through the output windings in a direction to cause opposite polarity magnetizing flux in the core. Using standard transformer technology, each of the output windings of the transformer would have the same number of turns; however, the direction of winding around the core would be in opposite directions so that the freewheeling current flow would tend to magnetize the core into saturation in one direction, i.e. in one quadrant of the magnetizing curve. For this reason, freewheeling diodes have heretofore been required to prevent current flow in the transformer secondary stage during the freewheeling period. These diodes diverted the freewheeling current so that it did not flow in the output windings. In accordance with the invention, the two output windings of the transformer are wound together adjacent to each other on the core with a coefficient of coupling greater than 0.980, and preferably greater than 0.990. By using the proper opposed winding direction and tight coupling, freewheeling current tends to flow through both output windings at the same time. The output windings coact as interrelated, current transformers during the flow of freewheeling current. This mutual transformer action balances the current flow through the two output windings of the transformer to a degree which prevents saturation, or substantial magnetization, of the core in either quadrant of the magnetizing curve during the flow of freewheeling current in both of the output windings.

In accordance with another aspect of the present invention, each of the output or secondary windings of the output transformer is divided into two, series connected, coil portions wound on opposite legs of the transformer core with one coil portion of the first output winding over a coil portion of the second output winding on one leg and the other coil portion of the first output winding under the coil portion of the second output winding on the second leg. This winding scheme enhances the mutual coupling and, when combined with the high coefficient of coupling obtained by winding the coil portion on each other, assures that freewheeling current flow in one output winding induces an equal current flow in the other output winding. The output windings act as current transformers having a turn ratio of 1:1. Consequently, during the freewheeling condition between output pulses, the freewheeling current is divided equally between the two output windings. Since the output windings are wound in the same direction, the freewheeling current flow in each of the output windings creates opposite magnetic flux in the core. This opposite flux has a magnitude based on the same number of turns in both windings and the same current flow in both windings; therefore, the induced flux is essentially canceled. The core is not magnetized to an appreciable extent by the freewheeling current.

In accordance with another aspect of the present invention, the input stage of the transformer includes two alternately pulsed primary windings, one of which is associated with the first output winding and the other of which is associated with the second output winding. Each of the primary windings of the transformer is wound on the core in a position directly over and, then, under the sandwiched, tightly coupled coil portions of the secondary output windings, so that the first coil portion of the first primary winding is directly over an associated first coil portion of the first output winding and the second coil portion of the first primary winding is directly under the second coil portion of the first output winding. The second input winding of the transformer is similarly located on the core of the transformer. Consequently, the transformer core has two separate legs each of which includes a coil portion of the first primary winding, a coil portion of the second primary winding, a coil portion of the first output winding and a coil portion of the second output winding, with the coil portions of the two output windings being in the middle and directly coupled to each other. The coefficient of coupling between the coil portions of the output windings is greater than 0.980. The coil portions of the primary windings are wound directly over or under the sandwiched, or overlapping, coil portions of the two output windings with coupling factors also greater than 0.980, and preferably greater than 0.990. This winding scheme produces a compact output transformer for an inverter type power supply, wherein the two primaries and two secondaries are divided into series connected coil portions, one of which portion is in an overlapping relationship with respect to the other of the coil portions. These overlapped portions are on each leg of the core used by the output transformer.

The primary object of the present invention is the provision of an improved inverter for inductive loads, such as an electric arc welding operation, of the type employing an output transformer with two alternately pulsed output windings, which improved inverter does not require freewheeling diodes, while still preventing high level transient conditions to occur in the input stage of the transformer.

Another object of the present invention is the provision of an improved inverter of the type defined above, which improved inverter includes two output windings tightly wound with respect to each other on the core of an output transformer in a fashion whereby freewheeling current through the two output windings occurs in opposite flux creating directions and wherein the coefficient of coupling between the two output windings is sufficiently high that the windings act as mutual current transformers with a turn ratio of essentially 1:1.

A further object of the present invention is the provision of a transformer for the output of an inverter, which transformer can be used with a welding load without requiring special freewheeling diodes and without applying high transient conditions to the input stage of the transformer.

These and other objects and advantages will become apparent from the following description taken together with the accompanying drawings.

BRIEF DESCRIPTION OF DRAWINGS

FIG. 5 is a wiring diagram illustrating operation of the present invention when an input pulse is applied through one of the primary windings;

FIG. 6 is a simplified wiring diagram illustrating the operating characteristics after the pulse of FIGS. 1 and 5, with the output windings illustrated in their inventive relationship;

FIGS. 7A–7C are schematic wiring diagrams, similar to FIG. 6, showing the theory of operation of the present invention and how it differs from standard technology; and, FIGS. 8 and 9, taken together, are a wiring diagram and a pulse chart illustrating operating characteristics of the preferred embodiment of the present invention.

PREFERRED EMBODIMENT

Figure 1:
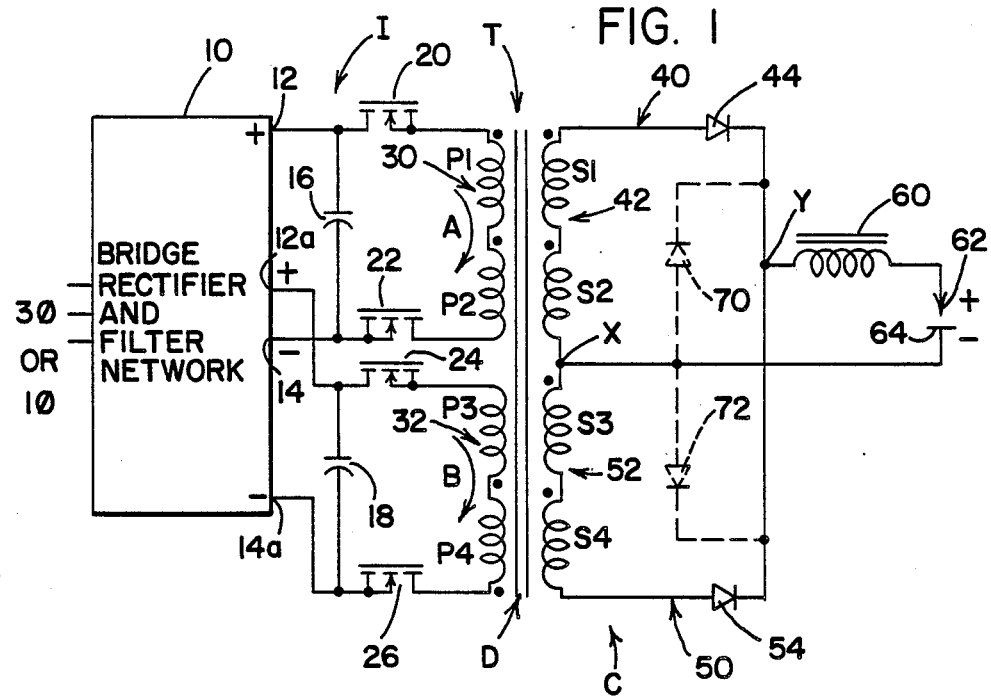
FIG. 1 is a wiring diagram showing an inverter circuit of the type to which the present invention is directed, with the winding directions used in the invention indicated by dots and with the previously used diodes indicated in dash lines.

Referring to the drawings wherein the showings are for the purpose of illustrating the preferred embodiment of the invention only, and not for the purpose of limiting same, inverter I includes an output stage or output circuit C including a transformer T with core D. Three phase or single phase power is provided to a rectifier and filter network 10 to create a generally regulated direct current supply across terminals 12, 14 and terminals 12a, 14a. These terminals provide controlled D.C. voltage for the pulses to transformer T. A first set of switches 20, 22 allows application of a D.C. current pulse, indicated as arrow A, through a first input winding 30. In a like manner, a second set of switches 24, 26 allows a D.C. current pulse indicated as arrow B to flow through a second input winding 32. In practice, switches 20–26 are power FETS which are operated by pulse width modulated control chips in accordance with standard practice. The width of the pulses is determined by the time the particular set of switches is in the conductive condition. Switches 20–26 can be rendered conductive or non-conductive by logic on a control line; therefore, there is no need to employ the restrict resonant type inverter using SCRs which must be commutated by the power supply output. The width of the D.C. current pulses is adjustable; however, the frequency is fixed. Thus, the impedance of the output circuit remains the same and no large choke is needed to drive the load. In the preferred embodiment, the frequency of operation is fixed at a frequency above the audio range, such as approximately 20 kHz. In accordance with normal operation, switches 20, 22 are rendered conductive. This causes a direct current pulse through winding 30, as indicated by arrow A. Thereafter, switches 20, 22 are rendered non conductive. This terminates the pulse A through winding 30. Thereafter, switches 24, 26 are rendered conductive to create a D.C. current pulse through winding 32, as indicated by arrow B. Thereafter switches 24, 26 are rendered non-conductive. Between the conductive conditions of the first and second sets of switches, is a freewheeling period or stage at which current circulates only in the output stage of transformer T. The freewheeling is between pulses; therefore, since the pulses have a frequency of 20 kHz, freewheeling is not over a widely variable duration. The duration is determined by the width of the pulses in the input stage of the transformer.

Inverter I can be operated at a lower voltage, such as 220–230 VAC, or at a higher voltage, such as 440–460 VAC. In the first instance, both terminals 12, 12a are connected to the positive output of rectifier 10, while terminals 14 and 14a are connected to the negative rectified output. Consequently, the two inverter sections operate in parallel and 180° out of phase. The high voltage operation is accomplished by connecting terminals 12a and 14 so the two inverter sections operate in series, but 180° out of phase with each other. Current flow is through one of the filter capacitors 16, 18. This aspect of a unit employed in practicing the present invention is described for a complete disclosure.

The present invention relates primarily to an improvement in output transformer T, wherein various coil portions of the individual input and output windings are physically associated in a novel winding scheme. In accordance with one aspect of the invention, input windings 30, 32 are formed by series connected coil portions P1, and P2, P3 and P4, respectively. These coil portions are wound, or wrapped, around the high permeability transformer core D to have the direction of polarity indicated by the dots, shown in FIG. 1. Coil portions P1, P2 form input winding 30. In a like manner, coil portions P3, P4 are connected in series to form input winding 32. Current flowing from terminal 12 to terminal 14, through input winding 30 creates flux in core D for the purpose of creating a first polarity output pulse. Current flow between terminals 12a, 14a, through input winding 32 creates an opposite polarity flux in core D of transformer T. Thus, in accordance with the normal operating condition, a current pulse A creates a first polarity output pulse while a current pulse B creates an opposite polarity output pulse for the transformer.

Transformer T includes a first output circuit 40 having a first output winding 42 with a unidirectional device, or diode, 44 which allows current to flow in a first direction between output terminals X, Y of the inverter of power supply I when a pulse is created in winding 30. Windings 30, 42 are associated with each other and are tightly coupled in a manner to be described later. Consequently, these windings have a direct relationship with respect to the creation of an output current pulse upon passage of a D.C. current pulse A through winding 30. Second output circuit 50 includes a second output winding 52 with a unidirectional device, or diode, 54. This second output circuit is also connected across output terminals X, Y so that output pulses in both circuits 40, 50 are directed through the inductive output load in the form of an electric arc welding station including an inductor or choke 60 and electrodes 62, 64, the latter of which is illustrated as the workpiece in the welding operation. Inductor 60 is employed to maintain an arc between output pulses created by current pulses A, B in windings 30, 32, respectively. Since the operating frequency is 20 kHz, this sustaining action need not be based upon storage of substantial energy.

In accordance with the present invention, output windings 42, 52 are divided into parallel connected coil portions S1, S2, S3 and S4. As shown in FIG. 1, input coil portion P1 is directly associated with output coil portion S1. In a like manner, input coils P2, P3 and P4 are directly associated with output coils or coil portions S2, S3, S4, respectively. As will be explained later, the associated input and output coil portions are wrapped over each other and have a tight coupling.

If expected transformer action were obtained, output circuits 40, 50 would need diodes 70, 72 for the purposes of allowing freewheeling current from inductor 60 between input pulses to flow between electrodes 62, 64. By employing the present invention, these diodes are not required. Indeed, if they are employed they do not carry a substantial amount of freewheeling current.

Figure 2:
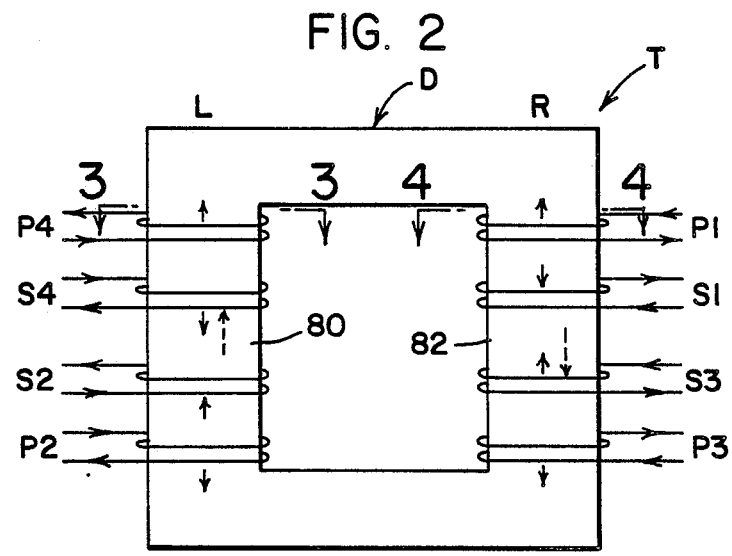
FIG. 2 is a schematic winding diagram of the coil winding scheme employed in the present invention.
Figure 3:
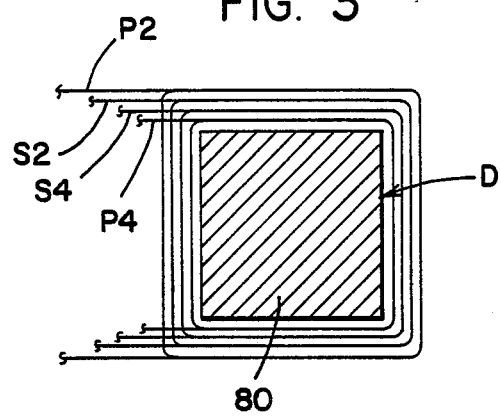
FIG. 3 is an enlarged cross sectional view taken generally along 3—3 of FIG. 2.
Figure 4:
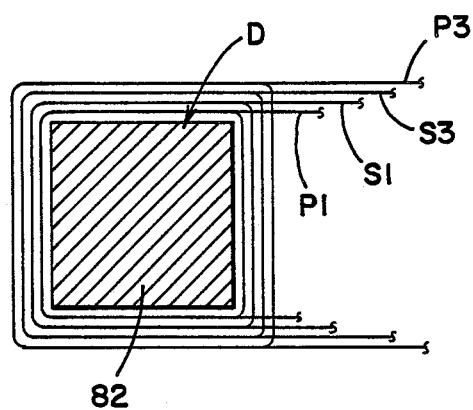
FIG. 4 is an enlarged cross sectional view taken generally along line 4—4 of FIG. 2.

Transformer T is wound in accordance with the winding or wrapping scheme shown in FIGS. 2–4. Core D includes two spaced legs 80, 82, shown as legs in a square core, onto which coil portions are wound in the direction indicated by the arrows on FIG. 2 and the dots in FIG. 1. The winding scheme diagram of FIG. 2 indicates overlapping, adjacent coils, as shown in FIGS.

3 and 4. Coil portion P1 of coil 30 is wrapped directly below coil portion S1 of coil 42 with a coefficient of coupling of at least 0.980 and preferably greater than 0.990. In a like manner, coil portion S1 of coil 42 is wrapped directly below coil portion S3 of coil 52 with coefficient of coupling in the same range. Last coil portion P3 of coil 32 is directly over coil portion S3 of coil 52. In a like manner, coil portions P2, S2, S4 and P4 are wrapped from outer to inner on space leg 80. This tight coupling and alternation between inner and outer positions of series connected coil portions produces a direct 1:1 relationship between associated coil portions. During input pulses A, B like D.C. output pulses are created in circuits 40, 50 shown in FIG. 1. A current pulse A passes through the inner coil portion of leg 82 and outer coil portion of leg 80. Directly adjacent these two coil portions are associated output coil portions S1, S2, respectively. Thus, D.C current pulse A creates a positive current pulse in coil 42, which is passed through circuit 40, including diode 44, through choke 60 and across electrodes 62, 64. D.C. current pulse B in winding 32 passes a current pulse through coil portions P3, P4 located on the outer coil portion of leg 82 and the inner coil portion of leg 80, respectively, as shown in FIG. 2, 3, and 4. The relative positions of the mutually wound coil portions are best shown in FIGS. 3 and 4. As can be seen, coil portions S1 and S3 and coil portions S4 and S2 are sandwiched between tightly wound coil portions of the primary windings. These coil portions are directly adjacent to each other and have mutual coupling coefficient of greater than 0.980 and preferably greater than 0.990.

The tight and alternate winding scheme is one aspect of the present invention. This scheme is combined with the novel concept of selecting the direction of winding of windings 42, 52 to create mutually cancelling fluxes in core D when freewheeling current flows in the opposite direction through windings 42, 52. This concept is indicated by the dots on FIGS. 1 and 5. As shown in FIG. 5, during the freewheeling period after an input pulse A, freewheeling current flows as indicated by the dashed arrows $I_A$, $I_B$. Current $I_B$ in coil portions S3, S4 creates core flux in an opposite direction through core D from the direction of flux created when winding 52 conducts freewheeling current $I_A$. Thus after pulse A creates an output pulse in circuit 40 current $I_A$ flows in circuit 40 and current $I_B$ flows in circuit 50. After an output pulse through output circuit 50, freewheeling current flows in the same way. Current $I_A$ will flow in winding 42 and current $I_B$ will flow in winding 52. This will cause opposite flux creation by windings 42, 52. In all instances, during the freewheeling mode, the flux creating currents through windings 42, 52 is in the opposite magnetic polarity or duration to cancel each other and prevent saturation of core D during the freewheeling period or stage. This novel feature with the winding scheme produces a substantially improved output circuit for inverter I.

The operating characteristics of the present invention are illustrated in FIG. 5. Pulse A creates current pulses in circuit flow in circuit 40. Winding 52 of circuit 50 is reverse biased with respect to diode 54. During this driving stage with D. C. current pulse A passing through series connected coil portions P1, P2, output current is induced by these coil portions into output sections S1, S2. At that time, total output current $I_T$ is the total current passing through choke 60 and across electrodes 62, 64. At that time, current pulse A attempts to drive output circuit 50 in the opposite direction which is prevented by diode 54. Consequently, there is no current flow $I_B$. Total current $I_T$ is equal to current $I_A$. When current pulse A is terminated by rendering switches 22, 24 non conductive, inductor 60 causes the total current $I_T$ to flow in accordance with the energy stored in inductor or choke 60. Since there is no input pulse to transformer T, current flows through both coils 42 and 52 as indicated by current $I_A$, $I_B$. This is the free-wheeling condition. By using the present invention the currents $I_A$, $I_B$ in these two branches are equal. Since coils 42, 50 are poled in the same direction, as indicated by the dots, currents $I_A$, $I_B$ flow in opposite directions through series connected coil portions of windings 42, 52 to create cancelling flux in core D. Consequently, core D does not tend to saturate during the freewheeling condition. Although not illustrated in FIG. 5, when a D.C. current pulse B as shown in FIG. 1 is created, coil portions P3, P4 pass current $I_B$ which equals the total load current $I_T$. Then, current $I_A$ is zero. Thereafter, the freewheeling condition is repeated when all switches 20–26 are again nonconductive. This condition is shown by the split current flow $I_A$, $I_B$ in FIG. 5.

FIG. 6 repeats the condition illustrated in FIG. 5 when all switches 20–26 are non-conductive. This is the freewheeling condition. At that time, the total current $I_T$ equals current $I_A$ plus current $I_B$. By constructing transformer T in accordance with the present invention, current $I_B$ passes through coil portions S3, S4 in a direction entering the dot end of the coil portions. Current $I_B$ causes winding 52 to act as a primary of a current transformer for inducing current in the closely coupled coil portions S1, S2. In a like manner current $I_A$ in winding 42 induces current to flow in winding 52. In accordance with the invention, the fluxes created in the core by these two currents ($I_A$, $I_B$) are in the opposite directions. Current $I_B$ enters the dot end of winding 52 and current $I_A$ leaves the dot end of winding 42 as indicated by the dots on FIG. 6. As will be explained later, the tight coupling of windings 42, 52 forces the two currents $I_A$, $I_B$, during the freewheeling, to be equal. Consequently, the flux created in opposite directions in core D is equal and opposite and, thus, cancels. There is balanced current flows during the freewheeling operation in both output circuits 40, 50 with the number of turns for windings 42, 52 being the same. Consequently, the core is not saturated even without using diodes 70, 72 shown in FIG. 1.

The present invention is illustrated in the schematic diagrams of FIG. 7A. Windings 42, 52 are tightly wound one on top of the other with a coefficient of coupling greater than 0.980. During the freewheeling mode, stage or period, total current $I_T$ passes into terminal X. Since the current flow would not be equally balanced automatically, a larger portion tends to flow through one of the output windings 42, 52. This unevenly distributed natural current flow is indicated schematically by the two solid arrows having, for illustrative purposes, a height indicative of a difference in current magnitudes. Due to the tight coupling of windings 42, 52, the windings act as mutual current transformers. The induced current flows in windings are indicated by the dashed arrows, with the height indicative of relative magnitude. As can be seen, a large current flow 100 illustrated as passing through winding 52 induces a corresponding current flow 100a in winding 42. A relatively lower natural current flow 102 in winding 42 induces a correspondingly low current flow 102a in winding 52. Due to the tight coupling indicated by the three lines of core D in FIG. 7A, a direct current transformer action is created so that current $I_A$ is equal to the sum of the current flows 100a, 102. In a like manner, the current flow $I_B$ in winding 52 equals the sum of current flows 100, 102a. Since current flow 100 equals current flow 100a and current flow 102 equals current flow 102a, the current transformer action causes current $I_A$ to equal current $I_B$. The sum of these two currents $I_A$, $I_B$, in turn, equals the total current flow $I_T$. Thus, by the current transformer action of the windings 42, 52, currents $I_A$, $I_B$ in windings 42, 52, respectively, are equal during the freewheeling period or stage. Thus, there is no need for diodes 70, 72 as shown in FIG. 1. Further, as the windings 42 52 are in the same winding polarity, when current flows through these two windings simultaneously one current flow is into the dot end of winding 52 and the other current flow is out of the dot end of winding 42. This creates opposite flux in core D which tends to cancel and prevent saturation of the core during the freewheeling.

In FIG. 7B, a lesser coupling coefficient is present. This is indicated by a single line for core D shown between windings 42', 52'. In this instance, the transformer action between the windings 42, 52 does not have a 1:1 ratio. Thus, the naturally occurring current flows represented by the solid line arrows create a lesser induced current flow in the opposite coil as represented by the dashed line arrow. The summation of solid arrows and dashed arrows current flow is imbalanced between current $I_A$ and current $I_B$. In the prior art as schematically illustrated in FIG. 7C, the two output windings 42, 52 are not wound over each other to form a current transformer action. Of course, the windings 42", 52" are on the same transformer core D. In this prior art type of transformer design, there is a complete imbalance between the current flow through the two output windings. Thus, there is a need for the diodes 70, 72 as shown in FIG. 1. In addition, the core can be saturated during the freewheeling stage of the inverter operation since the algebraic summation of flux during freewheeling current flow is substantial.

FIGS. 8 and 9 summarize the present invention. With switches 20, 22 conductive, pulse A is passed through coil portions P1, P2. This causes a high current flow $I_A$ in circuit 40. No current flow occurs in circuit 50. When switches 20, 22 are rendered non conductive, the output circuit enters its freewheeling mode. At that time, current $I_A$ equals current $I_B$. Then an input current pulse B is created in coil portions P3, P4 by rendering switches 24, 26 conductive. At that time, there is no current flow in circuit 40 and total current flow through circuit 50. When switches 24, 26 are thereafter rendered non conductive, the circuit enters its next freewheeling mode. At that time, in accordance with the present invention, currents $I_A$ and $I_B$ are substantially equal. Currents $I_A$, $I_B$ flow in opposite directions with respect to core D, thus, there is no substantial tendency to saturate or partially magnetize core D.

The present invention has been described as involving a coupling factor or coefficient of coupling approaching 1.0. In practice, the tight coupling of the present invention should exceed 0.950 and in the preferred embodiment it is 0.989. Thus, the coefficient of coupling should be greater than 0.980 and preferably greater than 0.990; however, a coupling coefficient between windings 42, 52 exceeding 0.950 will provide the benefits of the present invention.

Windings 42, 52 function as current transformers with one being the primary and the other being the secondary. Since the current flows are in the opposite direction there is no tendency to saturate or partially magnetize the core during the freewheeling mode. In this manner, the size of the switches may be reduced and no diodes 70, 72 are required. By winding the primary windings 30, 32 alternately on opposite sides of the sandwiched coil portions of windings 42, 52, a compact transformer winding is created with close coupling and a balanced flux effect caused by one coil portion being on the outside and the other coil portion being on the inside, with the coil portions being connected in electrical series.

Having thus defined the invention, the following is claimed:

1. In an inverter power supply including an output transformer of the type having a high permeability magnetic core; input means for applying an input current pulses to said core, said input means including an input winding encircling said core; a first output winding wound on said core; and a second output winding wound on said core; said power supply further including first and second output terminals; a first output circuit for connecting said first output winding of said transformer in parallel with said terminals; a second output circuit for connecting said second output winding of said transformer in parallel with said terminals; a unidirectional device in said first output circuit allowing current flow from said first output winding across said terminals in a first polarity direction; a unidirectional device in said second output circuit allowing current flow from said second output winding across said terminals in said first polarity direction; an inductor adapted to be connected in electrical series with said terminals; and, means for connecting said terminals across an output load, the improvement in said power supply comprising: said first and second output windings having essentially the same number of turns and being wound in the same flux creating direction on said core whereby freewheeling current from said inductor following application of said input current pulse to said input winding flows through said first and second output windings in a direction to cause opposite polarity magnetizing flux in said core and means for mounting said first and second output windings adjacent each other on said core with a coefficient of coupling greater than 0.980.

2. The improvement as defined in claim 1 wherein said mounting means includes means for wrapping one of said output windings directly over and in engagement with the other of said output windings.

3. The improvement as defined in claim 2 wherein said first output winding includes first and second series connected coil portions and said second output winding includes first and second series connected coil portions and said mounting means includes first means for mounting said first coil portion of the first output winding directly over said first coil portion of said second output winding and second means for mounting said second coil portion of said second output winding directly over said second coil portion of said first output winding.

4. The improvement as defined in claim 3 wherein said core includes first and second spaced legs, with said first mounting means for coil portions surrounding said first leg and said second mounting means for coil portions surrounding said second leg.

5. The improvement as defined in claim 1 wherein said first output winding includes first and second series connected coil portions and said second output winding includes first and second series connected coil portions and said mounting means includes first means for mounting said first coil portion of the first output winding directly over said first coil portion of said second output winding and second means for mounting said second coil portion of said second output winding directly over said second coil portion of said first output winding.

6. The improvement as defined in claim 5 wherein said core includes first and second spaced legs with said first mounting means for coil portions surrounding said first leg and said second mounting means for coil portions surrounding said second leg.

7. The improvement as defined in claim 1 wherein said coefficient of coupling is at least 0.990.

8. The improvement as defined in claim 2 wherein said coefficient of coupling is at least 0.990.

9. The improvement as defined in claim 5 wherein said coefficient of coupling is at least 0.990.

10. In an inverter power supply including an output transformer of the type having a high permeability magnetic core; input means for applying input current pulses to said core, said input means including a first and second input windings encircling said core; a first output winding wound on said core and associated with said first input winding; a second output winding wound on said core and associated with said second input winding; said power supply further including first and second output terminals; a first output circuit for connecting said first output winding of said transformer in parallel with said terminals; a second output circuit for connecting said second output winding of said transformer in parallel with said terminals; a unidirectional device in said first output circuit allowing current flow from said first output winding across said terminals in a first polarity direction; a unidirectional device in said second output circuit allowing current flow from said second output winding across said terminals in said first polarity direction; an inductor adapted to be connected in electrical series with said terminals; and, means for connecting said terminals across a pair of welding electrodes, the improvement in said power supply comprising: said first and second output windings having essentially the same number of turns and being wound in the same flux creating direction on said core whereby freewheeling current from said inductor following application of each of said input current pulses in said input windings flows through said output windings in a direction to cause opposite polarity magnetizing flux in said core and means for mounting said first and second output windings adjacent each other with a coefficient of coupling greater than 0.950.

11. The improvement as defined in claim 10 wherein said mounting means includes means for winding one of said output windings directly over and in engagement with the other of said output windings.

12. The improvement as defined in claim 10 wherein said first output winding includes first and second series connected coil portions and said second output winding includes first and second series connected coil portions and said mounting means includes first means for mounting said first coil portion of the first output winding directly over said first coil portion of said second output winding and second means for mounting said second coil portion of said second output winding directly over said second coil portion of said first output winding.

13. The improvement as defined in claim 12 wherein said core includes first and second spaced legs with said first mounting means for coil portions surrounding said first leg and said second mounting means for coil portions surrounding said second leg.

14. In an output transformer for converting input pulses into a series of output pulses used in a welding operation, said transformer having a core having two legs; first and second primary windings through which D.C. input current pulses are caused to flow for magnetizing said core alternately in opposite directions, said input pulses being spaced from each other a period during which freewheeling current flows in said welding operation, said transformer having a first output secondary winding into which is induced a first of said output current pulses when an input current pulse flows in said first primary winding and a second output secondary winding into which is induced a second of said current pulses when an input pulse flows in said second primary winding, said first and second output pulses having opposite polarity, the improvement comprising: said first and second output windings being directly mounted one over the other on said core with a coefficient of coupling of at least 0.950 and wound in a direction to cause opposite directions of magnetization during said periods of freewheeling current.

15. The improvement as defined in claim 14 wherein said first output winding includes first and second series connected coil portions and said second output winding includes first and second series connected coil portions and including first means for mounting said first coil portion of the first output winding directly over said first coil portion of said second output winding and second means for mounting said second coil portion of said second output winding directly over said second coil portion of said first output winding.

16. The improvement as defined in claim 15 and wherein said primary windings each include first and second series connected coil portions wherein a first leg of said core includes in succession the first coil portion of said first primary winding, the first coil portion of said first output winding, the first coil portion of said second output winding and the first coil portion of said second primary winding, the adjacent ones of said coil portions having coefficients of coupling of greater than 0.980.

17. The improvement as defined in claim 16 wherein a second leg of said core includes, in succession, the second coil portion of said second primary, the second coil portion of said second output winding, the second coil portion of said first output winding and the second coil portion of the first primary winding, the adjacent ones of said coil portions having coefficients of coupling of greater than 0.980.

18. The improvement as defined in claim 17 wherein said coefficients of coupling are greater than 0.990.

19. The improvement as defined in claim 16 wherein said coefficients of coupling are greater than 0.990.

20. In an output transformer for applying current in a given direction across the electrodes of an electric arc welding operation employing two alternately pulsed output circuits, each including an output winding with a given number of turns and a unidirectional device with said output winding encircling a high permeability magnetic core, the improvement comprising: said output windings being wound on said core with a direction to create opposite magnetic flux in said core between said pulsing of said output circuits and directly over each other with a coefficient of coupling between said output windings of at least 0.980.

21. The improvement as defined in claim 20 wherein said coefficient is greater than 0.980.

22. The improvement as defined in claim 20 wherein said coefficient is greater than 0.990.

23. The improvement as defined in claim 20 including means for winding one of said output windings directly over and in engagement with the other of said output windings.

24. The improvement as defined in claim 20 wherein the first of said output windings includes first and second series connected coil portions and the second of said output windings includes first and second series connected coil portions and said improved output transformer further including first means for mounting said first coil portion of the first output winding directly over said first coil portion of said second output winding and second means for mounting said second coil portion of said second output winding directly over said second coil portion of said first output winding.

25. The improvement as defined in claim 24 wherein said core includes first and second spaced legs with said first mounting means surrounding said first leg and said second mounting means surrounding said second leg.

* * * * *

UNITED STATES PATENT AND TRADEMARK OFFICE
Certificate

Patent No. 4,897,773                                                            Patented: Jan. 30, 1990

On petition requesting issuance of a certificate for correction of inventorship pursuant to 35 U.S.C. 256, it has been found that the above-identified patent, through error and without any deceptive intent, improperly sets forth the inventorship. Accordingly, it is hereby certified that the correct inventorship of this patent is:
Dale L. Bilczo and David N. Morris.

Signed and Sealed this Twenty-ninth Day of October, 1991.

STEVEN L. STEPHAN

*Supervisory Patent Examiner*
                                                                            *Patent Examining Art Unit 212*

UNITED STATES PATENT AND TRADEMARK OFFICE
CERTIFICATE OF CORRECTION

PATENT NO. : 4,897,773
DATED : January 30, 1990
INVENTOR(S) : Dale L. Bilczo

It is certified that error appears in the above—identified patent and that said Letters Patent is hereby corrected as shown below:

Column 2, line 50, after "from" delete the colon (:); line 51, "terminal" should read --- terminals ---. Column 7, line 31, "coefficient" should read --- coefficients ---. Claim 17, line 3, after "primary" insert --- winding ---.

Signed and Sealed this

Twelfth Day of November, 1991

Attest:

HARRY F. MANBECK, JR.

*Attesting Officer*           *Commissioner of Patents and Trademarks*